(12) United States Patent
Gualtieri

(10) Patent No.: US 7,605,585 B2
(45) Date of Patent: Oct. 20, 2009

(54) AIR-CORE TRANSFORMER POSITION SENSOR

(75) Inventor: Devlin M. Gualtieri, Ledgewood, NJ (US)

(73) Assignee: Honeywell International Inc., Morristown, NJ (US)

( * ) Notice: Subject to any disclaimer, the term of this patent is extended or adjusted under 35 U.S.C. 154(b) by 5 days.

(21) Appl. No.: 11/745,845

(22) Filed: May 8, 2007

(65) Prior Publication Data
US 2008/0278149 A1 Nov. 13, 2008

(51) Int. Cl.
*G01B 7/14* (2006.01)
*H01F 5/00* (2006.01)

(52) U.S. Cl. .................. 324/207.17; 324/207.15; 324/207.18

(58) Field of Classification Search .......... 73/313; 324/207.17, 207.15, 207.18
See application file for complete search history.

(56) References Cited

U.S. PATENT DOCUMENTS

| | | | |
|---|---|---|---|
| 3,137,831 A | 6/1964 | Foster | |
| 4,030,085 A | 6/1977 | Ellis et al. | |
| 4,644,355 A | 2/1987 | Russell | |
| 4,658,153 A | 4/1987 | Brosh et al. | |
| 4,723,446 A | 2/1988 | Saito et al. | |
| 5,777,468 A * | 7/1998 | Maher | 324/207.18 |
| 6,304,014 B1 | 10/2001 | England et al. | |
| 7,038,443 B2 | 5/2006 | Proksch et al. | |
| 2007/0152659 A1* | 7/2007 | Gurich et al. | 324/207.24 |

FOREIGN PATENT DOCUMENTS

| | | |
|---|---|---|
| DE | 3918185 A1 | 12/1990 |
| EP | 1308697 A2 | 5/2003 |
| WO | 0244647 A2 | 6/2002 |
| WO | 2006045210 A1 | 5/2006 |

OTHER PUBLICATIONS

EP Search Report, 08155743.1 dated Sep. 15, 2008.

* cited by examiner

*Primary Examiner*—Reena Aurora
(74) *Attorney, Agent, or Firm*—Ingrassia Fisher & Lorenz, P.C.

(57) ABSTRACT

An air-core transformer position sensor includes an excitation coil, an output coil, and a sensor coil. The excitation coil is adapted to be electrically excited with an excitation signal. The output coil is inductively coupled to the excitation coil upon electrical excitation of the excitation coil. The sensor coil is electrically shorted, is movable relative to the excitation coil and the output coil and, upon electrical excitation of the excitation coil, is inductively coupled to at least one of the excitation coil or the output coil.

14 Claims, 6 Drawing Sheets

AIR-CORE TRANSFORMER POSITION SENSOR

TECHNICAL FIELD

The present invention generally relates to position sensors and, more particularly, to transformer-type position sensors, such as linear variable differential transformer (LVDT) and rotary variable differential transformer (RVDT) position sensors, implemented using an air-core transformer.

BACKGROUND

Position sensors are included in various systems, devices, and environments. Moreover, various types of position sensors have been developed for inclusion into these various systems, devices, and environments. One particular genre of position sensor that has been developed is the transformer position sensor. A transformer position sensor typically includes a primary or excitation coil, a secondary or output coil, and a movable magnetically permeable core. When the excitation coil is electrically excited with an excitation signal, the output coil is inductively coupled to the excitation coil and supplies an output signal that is based on the position of the movable core. One particularly popular type of transformer position sensor is the variable differential transformer position sensor, which includes linear variable differential transformers (LVDTs) and rotary variable differential transformers (RVDTs). A variable differential transformer position sensor also includes an excitation coil, an output coil, and a movable magnetically permeable core. However, with variable differential transformer position sensors either the excitation coil or the output coil is configured as a pair of differentially wound coils that are electrically coupled in series.

The transformer position sensors described above are generally reliable and robust, but do suffer certain drawbacks. For example, the magnetic permeability of the core, and thus the inductive coupling of the excitation and output coils, varies considerably with temperature. Moreover, above a certain temperature, known as the Curie temperature, the core loses its magnetic properties altogether. Although various air-core transformer position sensors have been developed to alleviate the variations in core magnetic permeability with temperature, these sensors also suffer drawbacks. In particular, presently known air-core transformer position sensors rely on movable coils that are electrically connected to external circuitry, which can increase overall complexity.

Hence, there is a need for a transformer-type position sensor that is less sensitive to variations in the inductive coupling of the excitation and output coils with temperature and/or that does not rely on moving electrical connections. The present invention addresses one or more of these needs.

BRIEF SUMMARY

In one exemplary embodiment, an air-core transformer position sensor includes an excitation coil, an output coil, and a sensor coil. The excitation coil is adapted to be electrically excited with an excitation signal. The output coil is inductively coupled to the excitation coil upon electrical excitation of the excitation coil. The sensor coil is electrically shorted, is movable relative to the excitation coil and the output coil and, upon electrical excitation of the excitation coil, is inductively coupled to at least one of the excitation coil or the output coil.

In another exemplary embodiment, an air-core transformer position sensor includes a signal source, an excitation coil, an output coil, and a sensor coil. The signal source is operable to supply an excitation signal. The excitation coil is coupled to receive the excitation signal. The output coil is inductively coupled to the excitation coil upon excitation of the excitation coil with the excitation signal, to thereby supply an output signal. The sensor coil is electrically shorted, is movable relative to the excitation coil and the output coil and, upon excitation of the excitation coil with the excitation signal, is inductively coupled to at least one of the excitation coil or the output coil, whereby the output signal varies with movement of the sensor coil In yet another exemplary embodiment, an air-core variable differential transformer position sensor includes an excitation coil, a plurality of differentially wound output coils, and a sensor coil. The excitation coil is adapted to be electrically excited with an excitation signal. Each of the differentially wound output coils is inductively coupled to the excitation coil upon electrical excitation of the excitation coil. The electrically shorted sensor coil is movable relative to the excitation coil and the output coils and, upon electrical excitation of the excitation coil, is inductively coupled to at least one of the excitation coil or one or more of the output coils.

Other desirable features and characteristics of the position sensor will become apparent from the subsequent detailed description and the appended claims, taken in conjunction with the accompanying drawings.

BRIEF DESCRIPTION OF THE DRAWINGS

The present invention will hereinafter be described in conjunction with the following drawing figures, wherein like numerals denote like elements, and wherein.

DETAILED DESCRIPTION OF PREFERRED EMBODIMENTS

The following detailed description is merely exemplary in nature and is not intended to limit the invention or the application and uses of the invention. Furthermore, there is no intention to be bound by any theory presented in the preceding background or the following detailed description.

Figure 1:
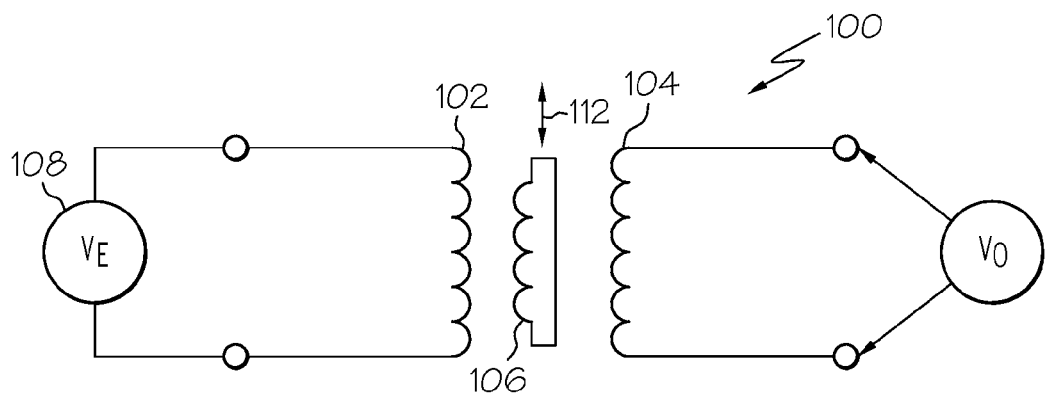
FIG. 1 is a schematic diagram of an exemplary embodiment of an air-core transformer position sensor according to the present invention.

Referring to FIG. 1, a schematic diagram of an exemplary embodiment of an air-core transformer position sensor 100 is depicted and includes an excitation (or primary) coil 102, an output (or secondary) coil 104, and a sensor coil 106. The excitation coil 102 is adapted to receive an excitation signal from an excitation signal source 108. Indeed, in FIG. 1, the excitation coil 102 is shown coupled to, and is thus electrically excited by the excitation signal supplied from, the excitation signal source 108. The output coil 102 is disposed such that it is inductively coupled to the excitation coil 102 when the excitation coil 102 is electrically excited. As a result, when the excitation coil 102 is electrically excited with an excitation signal, the output coil 104 supplies an output signal to a non-illustrated load. Although the relative disposition of the excitation coil 102 and the output coil 104 may vary, in a particular preferred embodiment the coils 102, 104 are concentrically disposed with the output coil 104 surrounding, or at least partially surrounding, the excitation coil 102.

The sensor coil 106 is electrically shorted, and disposed such that it is inductively coupled to at least one of the excitation coil 102 or the output coil 104 when the excitation coil 102 is electrically excited. In a particular preferred implementation, the sensor coil 106 is disposed such that it is inductively coupled to both the excitation and output coils 102, 104. Nonetheless, as FIG. 1 further depicts via direction arrow 112, the sensor coil 106 is also movable relative to the excitation coil 102 and the output coil 104. As a result, movement of the sensor coil 106 causes variations in the output signal supplied from the output coil 104. As with the relative disposition of the excitation coil 102 and the output coil 104, the relative disposition of the sensor coil 106 and the excitation and output coils 102, 104 may vary. Indeed, two exemplary variations the air-core transformer position sensor 100 are depicted, in simplified schematic form, in FIGS. 2 and 3 and will now be briefly described.

Figure 2:
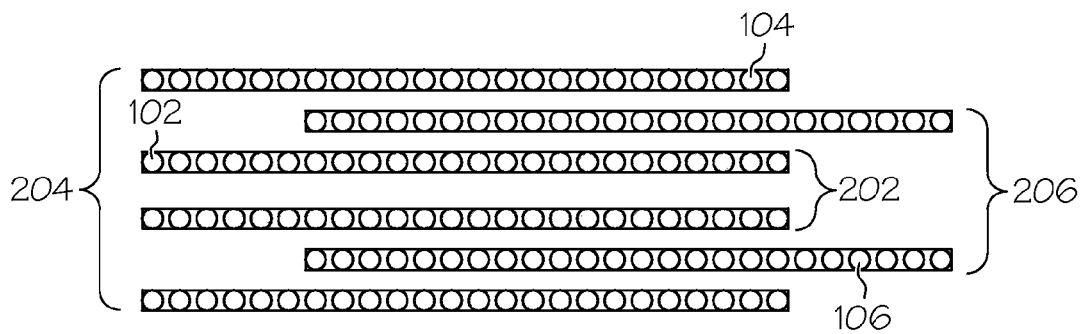
FIGS. 2 and 3 are simplified representations of varying physical arrangements of the coils that may be used to implement the sensor of FIG. 1.
Figure 3:
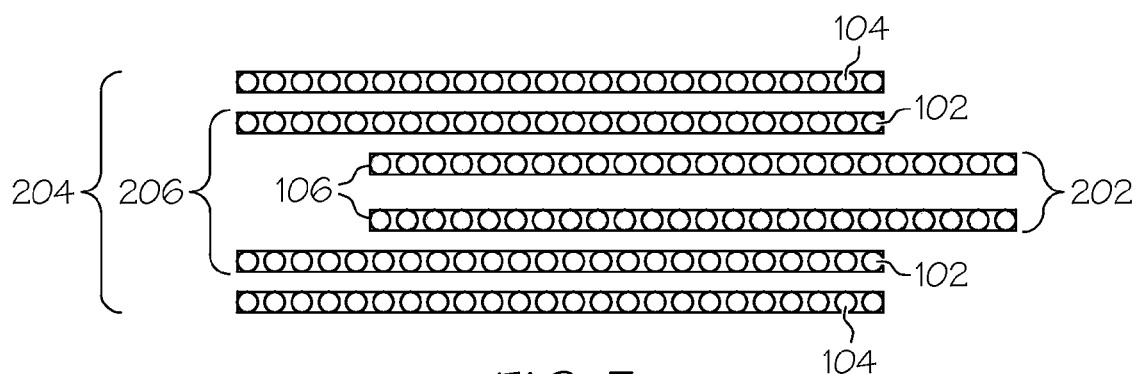

In both of the variations depicted in FIGS. 2 and 3, the air-core transformer position sensor 100 is implemented with an inner coil 202, an outer coil 204 that surrounds (or at least partially surrounds) the inner coil 202, and a middle coil 206 disposed between the inner and outer coils 202, 204 that surrounds (or at least partially surrounds) the inner coil 202. In FIG. 2, the excitation coil 102 is the inner coil 202, the output coil 104 is the outer coil 204, and the sensor coil 106 is the middle coil 206. In FIG. 3, however, the excitation coil 102 is the middle coil 206, the output coil 104 is once again the outer coil 204, and the sensor coil 106 is the inner coil 202.

Figure 4:
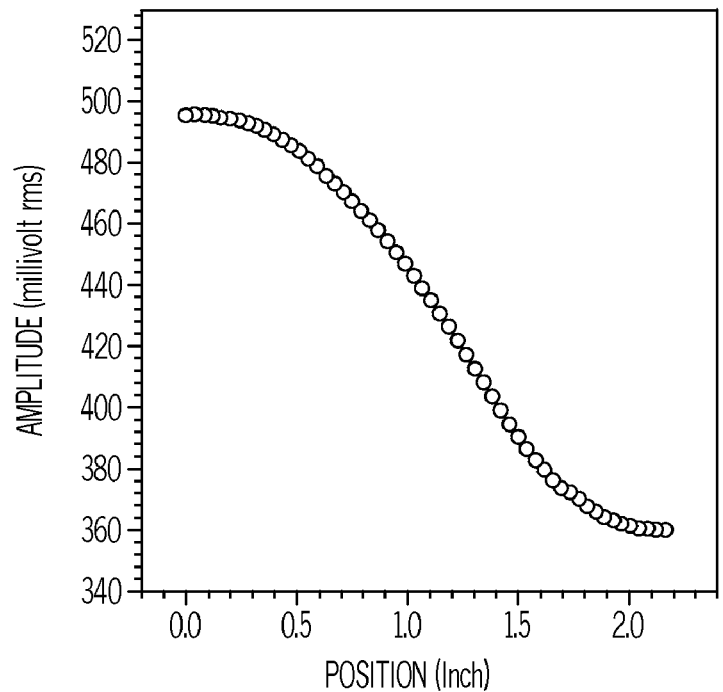
FIGS. 4 and 5 are graphs depicting the performance of exemplary sensors configured as depicted in FIGS. 2 and 3, respectively.
Figure 5:
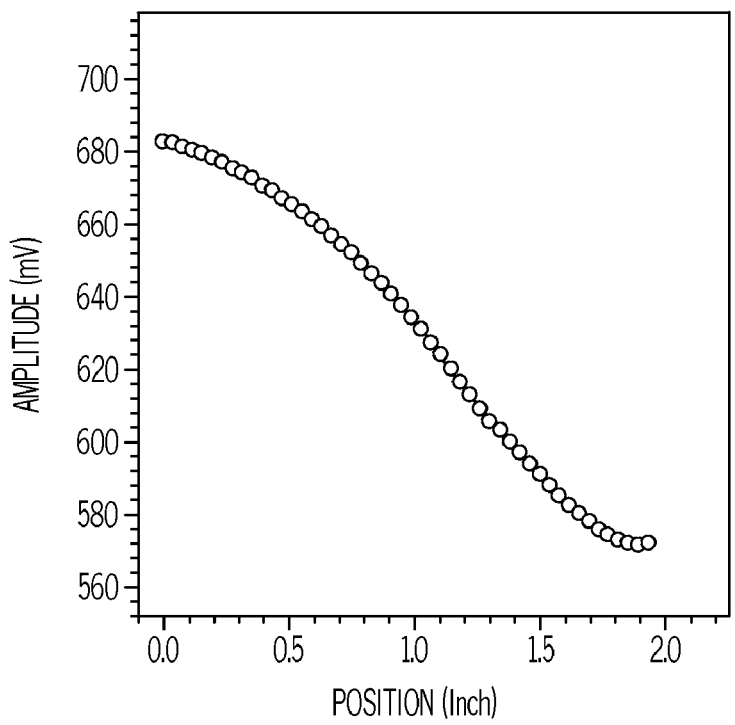

The performance of the air-core transformer position sensors 100 implemented in accordance with the embodiments depicted in FIGS. 2 and 3 was determined, and are graphically depicted in FIGS. 4 and 5, respectively. The performance depicted in FIG. 4 is for an air-core transformer position sensor 100 in which the excitation coil 102 is wound with 1000 turns of AWG 36 copper wire on a 0.386-inch coil form, the output coil 104 is 1000 turns of AWG 36 copper wire on a 0.82-inch coil form, and the sensor coil is 1000 turns of AWG 36 wire on a 0.50-inch coil form. The performance depicted in FIG. 5 is for an air-core transformer position sensor 100 in which the excitation coil 102 is wound with 1000 turns of AWG 36 copper wire on a 0.50-inch coil form, the output coil 104 is 1000 turns of AWG 36 copper wire on a 0.82-inch coil form, and the sensor coil is 1000 turns of AWG 36 wire on a 0.386-inch coil form. In both instances, the excitation coil 102 was electrically excited with a 3 kHz, 1.0 volt excitation signal. It will be appreciated that these configurations are merely exemplary of numerous configurations that may be used to implement the air-core transformer sensor 100.

Figure 6:
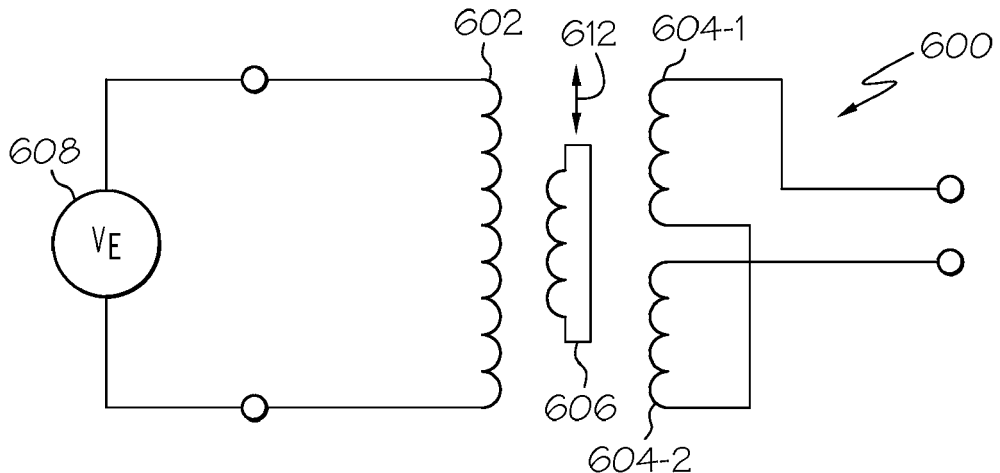
FIG. 6 is a schematic diagram of an exemplary embodiment of an air-core linear variable differential transformer (LVDT) position sensor according to the present invention.

Turning now to FIG. 6, a schematic diagram of an exemplary embodiment of an air-core linear variable differential transformer (LVDT) position sensor 600 is depicted and will be described. The LVDT sensor 600 includes an excitation coil 602, a plurality of differentially wound output coils 604-1, 604-2, and a sensor coil 606. The excitation coil is adapted to be electrically excited with an excitation signal. The excitation coil 602, similar to the previously described embodiments, is adapted to receive an excitation signal from an excitation signal source 608. And, in FIG. 6, the excitation coil 602 is shown coupled to, and is thus electrically excited by the excitation signal supplied from, the excitation signal source 608.

The differentially wound output coils 604-1, 604-2 are disposed such that each is inductively coupled to the excitation coil 602 when the excitation coil 602 is electrically excited. As a result, when the excitation coil 602 is electrically excited with an excitation signal, the output coils 604-1, 604-2 supply an output signal to a non-illustrated load. As with the previously described embodiments, the relative disposition of the excitation coil 602 and the output coils 604-1, 604-2 may vary; however, in a particular preferred embodiment the excitation and output coils 602, 604-1, 604-2 are concentrically disposed, with the output coils 604-1, 604-2 surrounding, or at least partially surrounding, the excitation coil 602. It will be appreciated that although the depicted embodiment is implemented with two output coils 604-1, 604-2 the sensor 600 could be implemented with more than this number of output coils, if needed or desired.

The sensor coil 606 is configured substantially similar to the previously described sensor coil 106 in that it is electrically shorted. Moreover, the sensor coil 606 is disposed such that it is inductively coupled to at least one of the excitation coil 602 or the output coils 604-1, 604-2 when the excitation coil 602 is electrically excited. In a particular preferred implementation, the sensor coil 606 is disposed such that it is inductively coupled to both the excitation coil 602 and the output coils 604-1, 604-2. As further depicted via direction arrow 612, the sensor coil 606 is also movable relative to the excitation coil 602 and the output coils 604-1, 604-2. As a result, movement of the sensor coil 606 causes variations in the output signal supplied from the output coil 604. As with the relative disposition of the excitation coil 602 and the output coils 604-1, 604-2, the relative disposition of the sensor coil 606 and the excitation coil 602 and the output coils 604-1, 604-2 may vary. Two exemplary variations the air-core LVDT position sensor 600 are depicted, in simplified schematic form, in FIGS. 7 and 8 and will now be briefly described.

Figure 7:
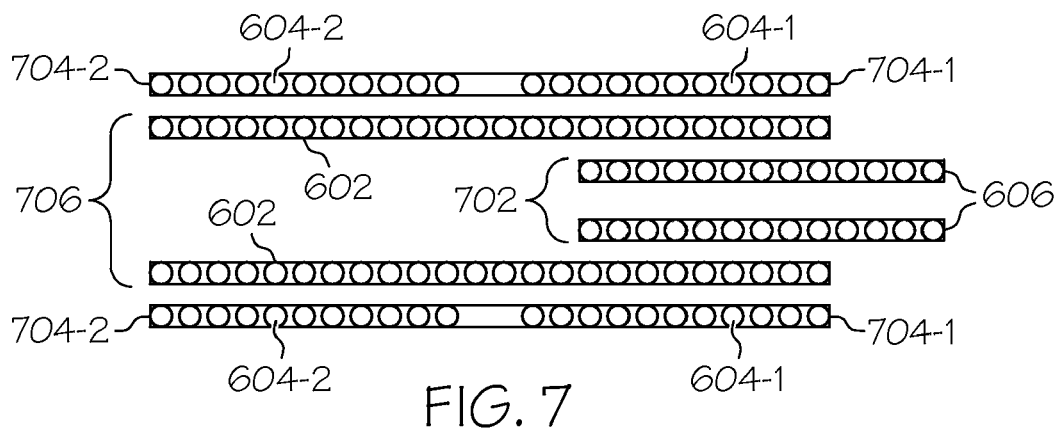
FIGS. 7 and 8 are simplified representations of relative physical arrangements of the coils that may be used to implement the LVDT of FIG. 6.
Figure 8:
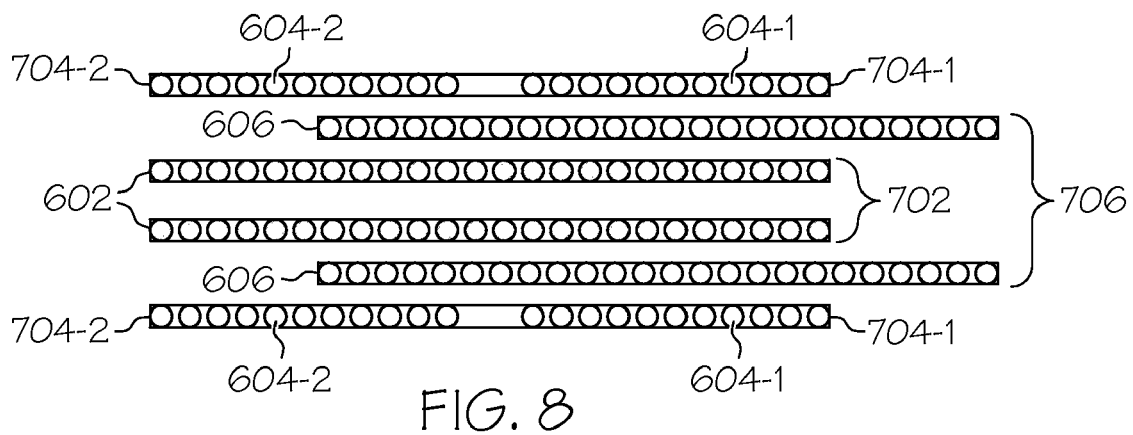

The air-core LVDT position sensor 600 variations depicted in FIGS. 7 and 8, like the variations previously described, are each implemented with an inner coil 702, a plurality of outer coils 704 (e.g., 704-1, 704-2) that surrounds (or at least partially surrounds) the inner coil 702, and a middle coil 706 disposed between the inner coil 702 and the outer coils 704 that surrounds (or at least partially surrounds) the inner coil 702. In FIG. 7, the excitation coil 602 is the middle coil 706, the output coils 604-1, 604-2 are the outer coils 704, and the sensor coil 606 is the inner coil 702. In FIG. 8, however, the excitation coil 602 is the inner coil 702, the output coils 604-1, 604-2 are once again the outer coils 704, and the sensor coil 606 is the middle coil 706.

Figure 9:
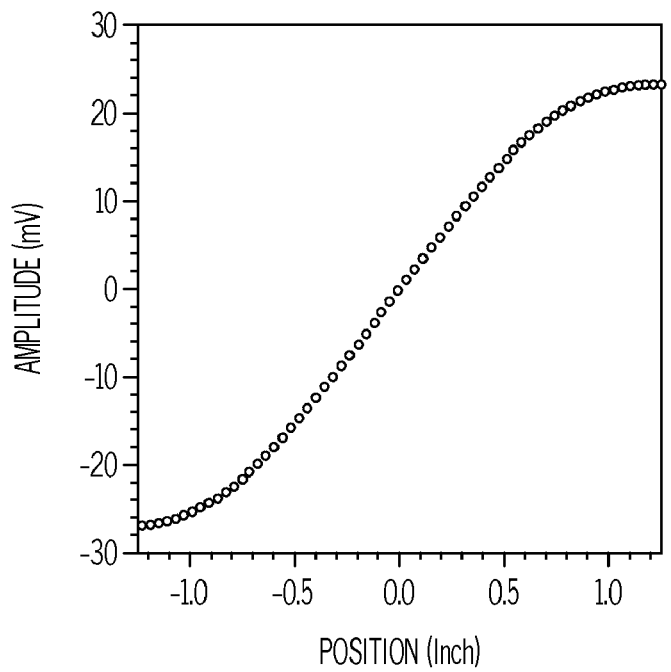
FIGS. 9 and 10 are graphs depicting the performance of an exemplary LVDT configured as depicted in FIG. 7.
Figure 10:
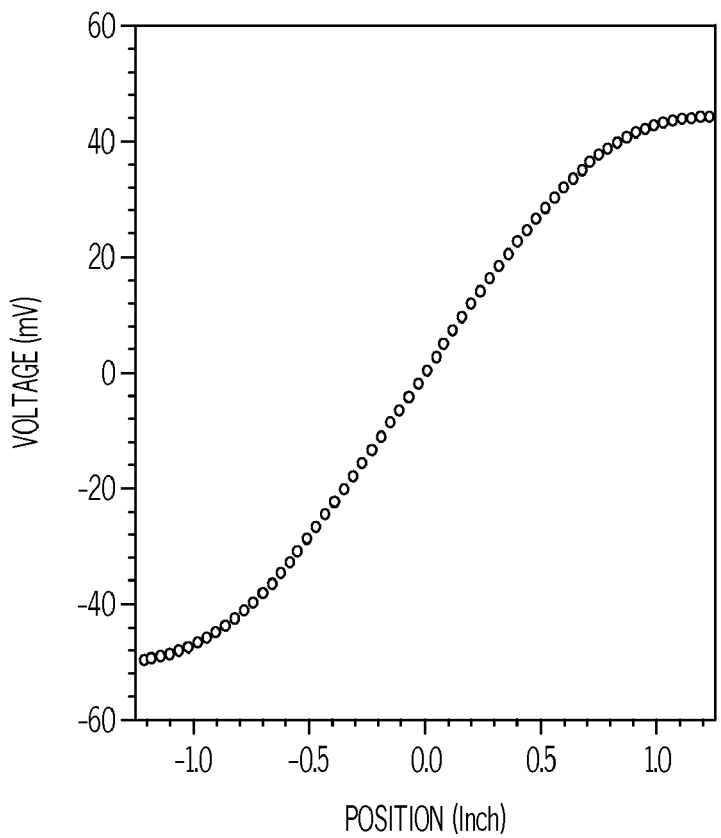
Figure 11:
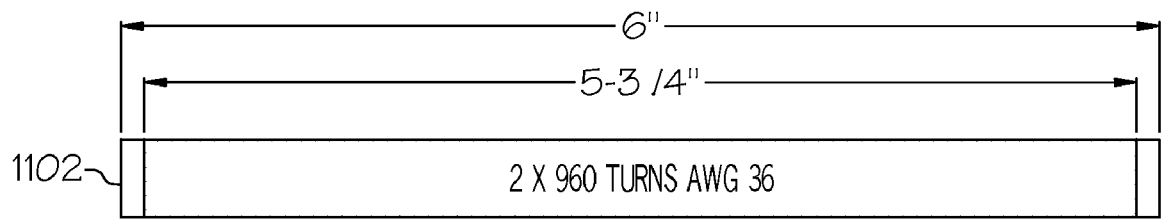
FIGS. 11-13 are simplified schematic representations of exemplary winding schemes for the coils that implement an exemplary LVDT sensor in accordance with FIG. 7.
Figure 12:
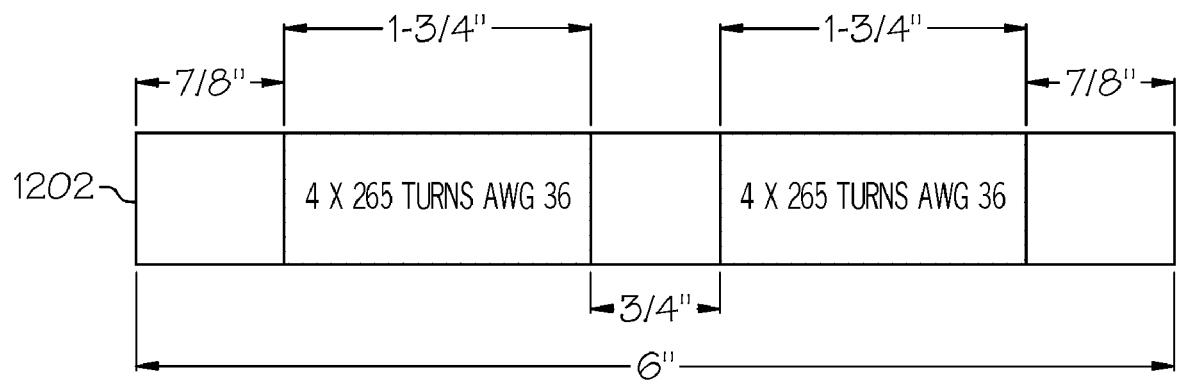
Figure 13:
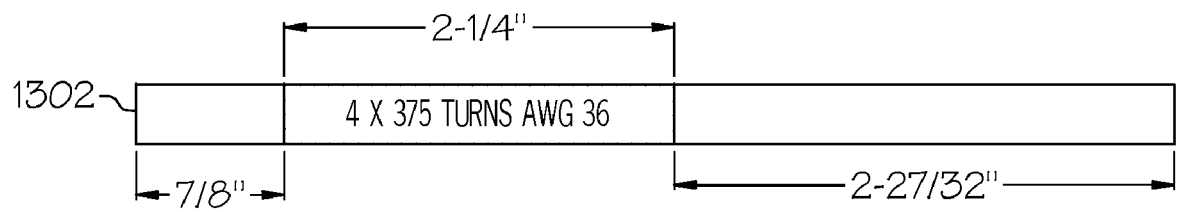

The performance of the air-core LVDT position sensor 600 implemented in accordance with the embodiment depicted in FIG. 7 was determined, and is graphically depicted in FIGS. 9 and 10. The position indicated on these graphs is the relative position of the sensor coil with respect to the mid-point of the differential coils. The specific LVDT position sensor 700 from which these performance data were derived is configured in accordance with the winding scheme depicted in FIGS. 11-13. It will be appreciated that this scheme is merely exemplary of any one of numerous schemes and configurations that may be used to implement the LVDT sensor 700. As depicted in FIG. 11, the excitation coil 602 is wound with two layers of 960 turns each using AWG 36 copper wire on a 6.0-inch long, 0.437-inch outer diameter ceramic tube 1102. The length of the excitation coil 602 is about 5.75-inches. The differentially wound output coils 604-1, 604-2, as depicted in FIG. 12, are each wound with four layers of 265 turns of AWG 36 copper wire on a 6.0-inch long, 0.75-inch outer diameter ceramic tube 1202. The output coils 604-1, 604-2 are each about 1.75-inches in length, and are spaced apart by about 0.75-inches, which is equal to the coil diameters. The sensor coil 606, which is depicted in FIG. 13, is wound with four layers of 365 turns of AWG 36 wire on a 6.0-inch long, 0.219-inch outer diameter ceramic tube 1302. The length of the sensor coil 606 is about 2.25-inches.

Figure 14:
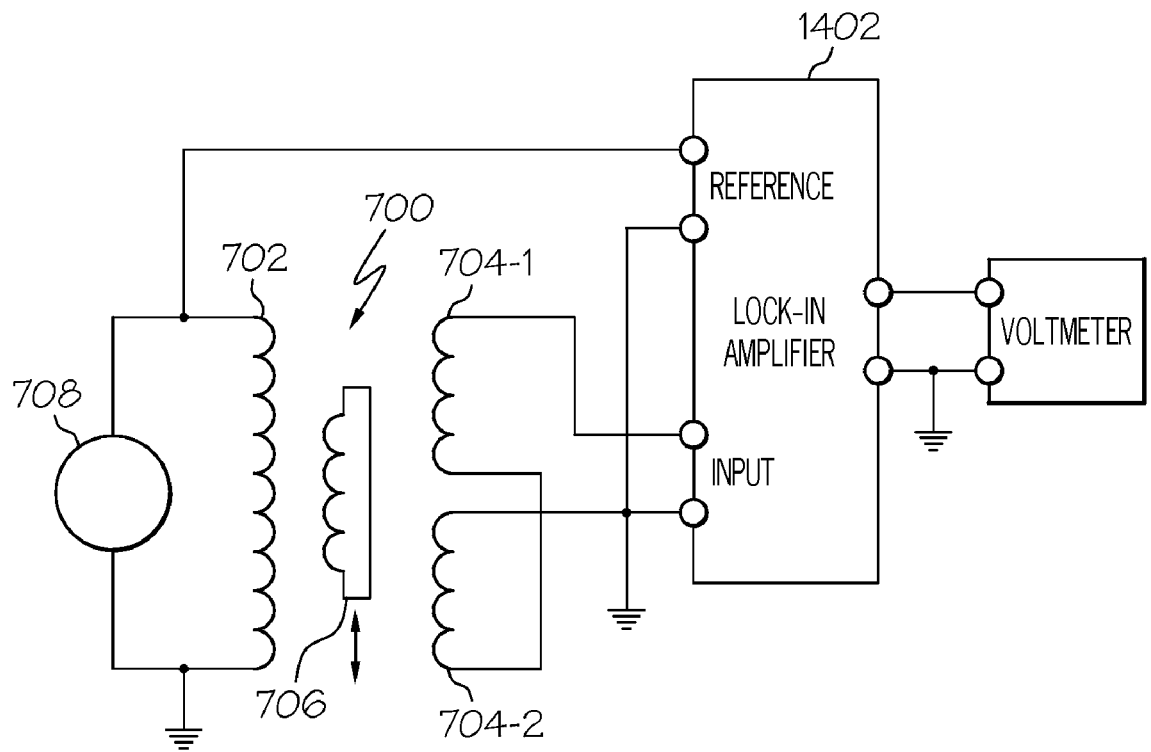
FIG. 14 is a schematic diagram of a test setup for detecting the performance data depicted in FIGS. 9 and 10.

In addition to the above, it is noted that the performance depicted in FIGS. 8 and 9 was determined using the test setup configuration 1400 depicted schematically in FIG. 14. With this configuration, the excitation signal source 708 supplies a 3 kHz, 3.6 volt excitation signal to the excitation coil 702. Moreover, a lock-in amplifier 1402 is coupled to the excitation coil 702 and the output coils 704-1, 704-2 so that the relative phase between the excitation coil 702 and the output coils 704-1, 704-2 could be adjusted to assure maximum output voltage. It is thus noted that the performance data depicted in FIG. 9 is for a zero difference in relative phase between the excitation coil 702 and the output coils 704-1, 704-2, and the performance data depicted in FIG. 10 is for a 45-degree difference in relative phase between the excitation coil 702 and the output coils 704-1, 704-2.

Figure 15:
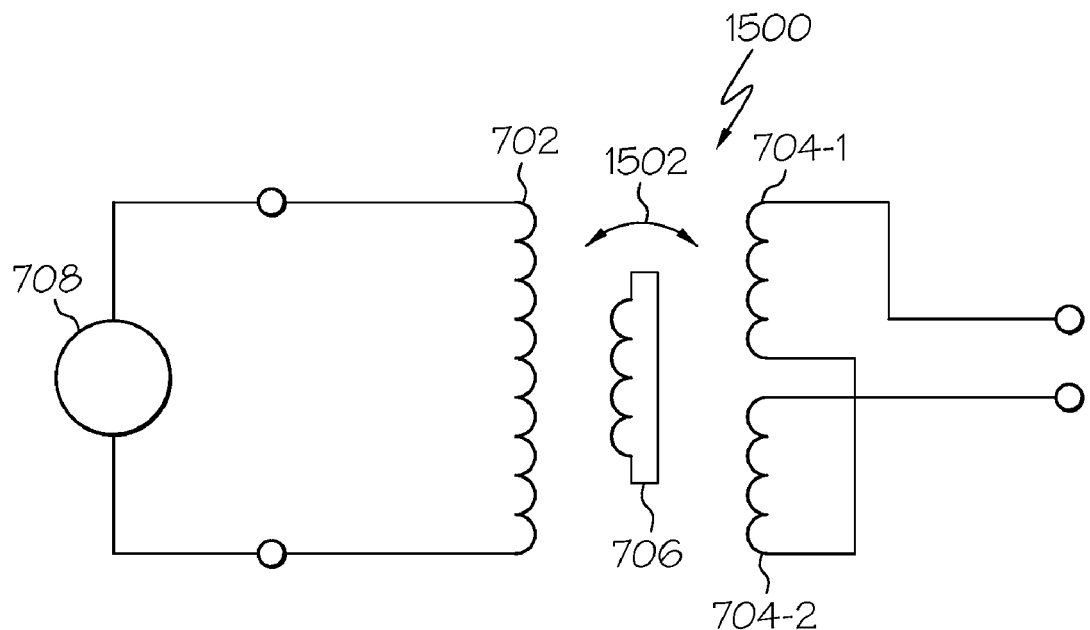
FIG. 15 is a schematic diagram of an exemplary embodiment of an air-core rotary variable differential transformer (RVDT) position sensor according to the present invention.

It will be appreciated that the sensor 700 described above is not limited to configuration as an LVDT position sensor. For example, and as depicted in FIG. 15, the sensor could be implemented as a rotary differential transformer (RVDT) position sensor 1500. It is noted that the RVDT position sensor 1500 is illustrated using like reference numerals for like parts of the sensor 700 depicted in FIG. 7. The main difference being that the sensor coil 706 is movable in a rotational fashion 1502 relative to the excitation coil 702 and the output coils 704-1, 704-2.

The position sensors described herein are significantly less sensitive to variations in the inductive coupling of the excitation and output coils with temperature, as compared to presently known transformer-type sensors. The position sensors also do not rely on moving electrical connections, and are thus relatively more reliable than presently known transformer-type sensors.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An air-core transformer position sensor, comprising:
    an excitation coil adapted to be electrically excited with an excitation signal;
    an output coil inductively coupled to the excitation coil upon electrical excitation of the excitation coil; and
    a sensor coil, the sensor coil electrically shorted and movable relative to the excitation coil and the output coil and, upon electrical excitation of the excitation coil, inductively coupled to at least one of the excitation coil or the output coil,
    wherein:
        the excitation coil, the output coil, and the sensor coil are concentrically disposed, and
        the output coil surrounds the excitation coil and at least partially surrounds the sensor coil.

2. The sensor of claim 1, wherein the sensor coil is concentrically disposed between at least a portion of the excitation coil and at least a portion of the output coil.

3. The sensor of claim 1, wherein the excitation coil is concentrically disposed between at least a portion of the sensor coil and at least a portion of the output coil.

4. The sensor of claim 1, wherein the output coil comprises a plurality of differentially wound coils.

5. The sensor of claim 1, further comprising:
    a signal source coupled to the excitation coil and operable to supply an excitation signal thereto.

6. The sensor of claim 5, wherein:
    the output coil is configured, upon excitation of the excitation coil with the excitation signal, to supply an output signal; and
    movement of the sensor coil relative to the excitation coil and the output coil varies the output signal.

7. An air-core transformer position sensor, comprising:
    a signal source operable to supply an excitation signal;
    an excitation coil coupled to receive the excitation signal;
    an output coil inductively coupled to the excitation coil upon excitation of the excitation coil with the excitation signal to thereby supply an output signal; and
    a sensor coil, the sensor coil electrically shorted and movable relative to the excitation coil and the output coil and, upon excitation of the excitation coil with the excitation signal, inductively coupled to at least the excitation coil, whereby the output signal varies with movement of the sensor coil,
    wherein:
        the excitation coil, the output coil, and the sensor coil are concentrically disposed, and
        the output coil surrounds the excitation coil and at least partially surrounds the sensor coil.

8. The sensor of claim 7, wherein the sensor coil is concentrically disposed between at least a portion of the excitation coil and at least a portion of the output coil.

9. The sensor of claim 7, wherein the excitation coil is concentrically disposed between at least a portion of the sensor coil and at least a portion of the output coil.

10. The sensor of claim 7, wherein the output coil comprises a plurality of differentially wound coils.

11. An air-core variable differential transformer position sensor, comprising:
    an excitation coil adapted to be electrically excited with an excitation signal;
    a plurality of differentially wound output coils, each output coil inductively coupled to the excitation coil upon electrical excitation of the excitation coil; and
    a sensor coil, the sensor coil electrically shorted and movable relative to the excitation coil and the output coils and, upon electrical excitation of the excitation coil, inductively coupled to at least one of the excitation coil or one or more of the output coils, wherein:

the excitation coil, the output coil, and the sensor coil are concentrically disposed, and the output coil surrounds the excitation coil and at least partially surrounds the sensor coil.

12. The sensor of claim 11, wherein the sensor coil is concentrically disposed between at least a portion of the excitation coil and at least a portion of the output coil.

13. The sensor of claim 11, wherein the excitation coil is concentrically disposed between at least a portion of the sensor coil and at least a portion of the output coil.

14. The sensor of claim 11, further comprising:

a signal source coupled to the excitation coil and operable to supply an excitation signal thereto, wherein:

the output coils are configured, upon excitation of the excitation coil with the excitation signal, to supply an output signal, and movement of the sensor coil relative to the excitation coil and the output coil varies the output signal.

* * * * *